United States Patent [19]
Fenton

[11] Patent Number: 6,032,714
[45] Date of Patent: Mar. 7, 2000

[54] REPEATABLY POSITIONABLE NOZZLE ASSEMBLY

[76] Inventor: Jay Thomas Fenton, 451 Granger Dr., Bear, Del. 19701

[21] Appl. No.: 09/261,525

[22] Filed: Mar. 3, 1999

Related U.S. Application Data

[63] Continuation of application No. 09/072,351, May 1, 1998, abandoned.

[51] Int. Cl.[7] .................................................. B29C 65/10
[52] U.S. Cl. ........................... 156/497; 156/82; 156/499; 156/555
[58] Field of Search .............................. 156/82, 497, 499, 156/555, 583.1

[56] References Cited

U.S. PATENT DOCUMENTS

| | | | |
|---|---|---|---|
| 1,084,094 | 1/1914 | Loosen | 239/723 |
| 2,895,688 | 7/1959 | Seiberling et al. | 239/559 |
| 3,075,868 | 1/1963 | Long | 156/82 |
| 3,336,464 | 8/1967 | Hittenberger et al. | 219/374 |
| 3,472,720 | 10/1969 | Harvey et al. | 156/320 |
| 3,698,973 | 10/1972 | Wisotzky et al. | 156/78 |
| 3,720,565 | 3/1973 | Cavanna | 156/497 |
| 3,788,917 | 1/1974 | Linda | 156/82 |
| 3,825,408 | 7/1974 | Farfaglia et al. | 432/230 |
| 3,953,272 | 4/1976 | Webber | 156/152 |
| 4,080,237 | 3/1978 | Deimel | 156/226 |
| 4,447,288 | 5/1984 | Seaman | 156/574 |
| 4,608,114 | 8/1986 | Nakao | 156/497 |
| 4,747,903 | 5/1988 | Miller | 156/366 |
| 4,769,102 | 9/1988 | Neumuller et al. | 156/359 |
| 4,855,044 | 8/1989 | Calloni et al. | 210/195.1 |
| 4,950,352 | 8/1990 | Greller | 156/497 |
| 5,804,029 | 9/1998 | Achelpohl et al. | 156/497 |

FOREIGN PATENT DOCUMENTS 2 204 827  11/1988  United Kingdom .

*Primary Examiner*—James Sells
*Attorney, Agent, or Firm*—Gary A. Samuels

[57] ABSTRACT

A nozzle assembly adapted for repeatably positioning the nozzle in a precise relationship to an article and method for using it in a seam-sealing operation, the nozzle assembly comprising a nozzle, an alignment plate, and an arm forming a unitary nozzle assembly, and an air conduit for connecting the nozzle to a source of pressurized air. The nozzle assembly may further comprise a base for mounting the integral nozzle unit alignment plate, and a linear actuator connected to the base for moving the base along a linear path from a first, operating position to a second, standby position. The nozzle may be oriented to avoid visually obstructing the article receiving air flow. The nozzle may be attached to a seam sealing machine and may discharge a heated air stream of sufficient temperature to melt seam sealing tape adhesive backing to adhere such tape to fabric, and the nozzle assembly may further include a thermocouple assembly attached to the integral nozzle unit for measuring the air stream temperature near the point of discharge from the nozzle.

17 Claims, 6 Drawing Sheets

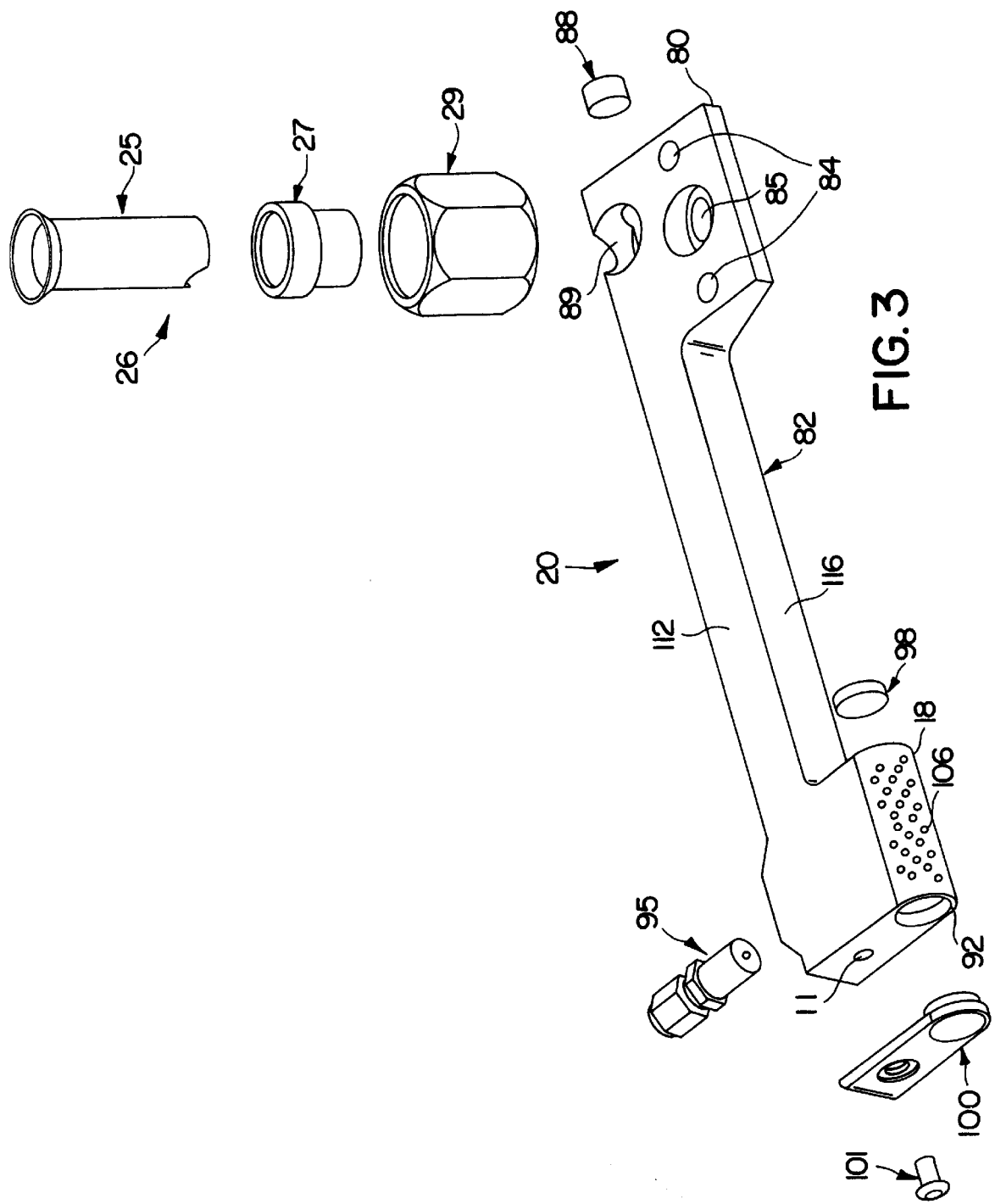

REPEATABLY POSITIONABLE NOZZLE ASSEMBLY

CROSS REFERENCE TO RELATED APPLICATIONS

This application is a continuation of application Ser. No. 09/072,351 filed May 1, 1998 now abandoned.

TECHNICAL FIELD

This invention relates to a nozzle assembly adapted for repeatably positioning the nozzle in a precise relationship to an article, more particularly to a nozzle assembly capable of movement along a linear path from a first operating position to a second standby position, and specifically to a hot air nozzle assembly used in a process for sealing seams.

BACKGROUND OF THE INVENTION

In the manufacture of waterproof garments and other waterproof fabric assemblies having stitched seams at intersecting areas of cloth, it is often advantageous to seal such seams with a seam tape. This is especially necessary wherein the seams would violate the integrity of the waterproofing, if not for the application of such a seal. The present invention is particularly useful for seam sealing of waterproof garments made from Gore-Tex fabric laminates, but would be generally useful for any sealing operation used to preserve the integrity of the waterproof properties of joined fabrics or generic fabric laminates.

Seams are typically sealed using a seam tape made of a fabric similar to the fabrics comprising the seam to be joined, and having a hot-melt polyurethane adhesive on one side of the tape. A nozzle emits a stream of hot air directed at the tape sufficient to activate the hot-melt adhesive, and the tape and the seam are cooperatively pressed together between a pair of nip rollers to bind the adhesive tape over the seam.

Specifically, waterproof garments made from Gore-Tex fabric laminates are manufactured using Gore-Seam sealing machines to perform the sealing operation, but other manufacturers make and use machines performing similar duties. To assure seams of consistent quality are manufactured using such machines, it is important to position the nozzle precisely in the optimum location to apply the stream of hot air uniformly to the tape to evenly melt the adhesive, thus enabling creation of a perfect seal each and every time. Typically, the requirement for precision in location has been met through the use of positioners adjustable in each of the three degrees of freedom (vertical, first horizontal, second horizontal substantially perpendicular to first horizontal) to position an arm onto which the nozzle is mounted. To enable quick loading and unloading of the garments to be sealed in such machines, the arm is capable of being moved in and out of the precise position quickly, usually through the use of an automatic actuator.

Typically, the nozzle is part of a nozzle assembly which consists of a nozzle body connected to an air manifold having a configuration necessary to transport the hot air from a hot air supply to the desired location of the nozzle body. Typically, the manifold comprises metal tubing welded to the nozzle body at one end and welded to a screwed coupling at the other end for connection of the nozzle assembly to the hot air supply.

As metal tubing is inherently difficult to bend or weld to tight tolerances, each nozzle assembly therefore has slightly different dimensions. Similarly, a typical screwed coupling does not allow repeatable realignment of the nozzle assembly if it must be removed for any reason, such as for cleaning. Therefore if the nozzle assembly on a machine must be removed or replaced, the positioners must be re-adjusted in each degree of freedom to precisely reposition the nozzle in relation to the work area. Repositioning may be a time-consuming operation that increases the overall manufacturing time, and/or it may cause some off-quality product rejects due to trial and error, thus wasting product.

The seams made with a seam-sealing machine are typically still the weakest link in the overall waterproof property of the garment, because the adhesive seal holding the tape over the seam eventually may fail.

During the manufacture of the seams, the seam sealing machine operators prefer to observe the interface of the sealing surfaces during the operation to assure correct alignment of the seam tape with the seam. Prior nozzle designs have tended to place the nozzle directly in front of the seam interface, thus obscuring the vision of the machine operator. Again, any number of nozzle uses might be similarly disadvantaged by a nozzle design that obstructs the nozzle operator's view of the article at which the nozzle is directed.

The heat of the hot air exiting the nozzle is also critical to proper adhesive melting and subsequent attachment. Prior nozzle designs have been equipped with a thermocouple on the hot air supply, thereby measuring the air temperature prior to the radiative heat loss from the tubing between the thermocouple and the nozzle outlet. Use of a thermocouple so placed does not measure the true air temperature at the exit of the nozzle, which is the critical temperature for the adhesive melting operation, and foreseeably would be a critical temperature for other hot air nozzle uses.

The prior art generally discloses nozzles of any number of configurations for heat welding or hot air seam sealing, none of which specifically address the problems discussed herein. It is the object of the present invention, therefore, to provide a nozzle assembly adapted for repeatably positioning the nozzle in a precise relationship to the article to receive the air stream. It is a further object of the invention that the nozzle assembly enable the nozzle to be removed and replaced in the same position relative to the article. It is a feature of the present invention to provide such a nozzle assembly that can be used without obscuring the nozzle operators vision of the article, such as a seam sealing tape. A still further feature of the present invention is to incorporate a thermocouple integral to the nozzle to provide temperature measurement close to the nozzle exit.

SUMMARY OF THE INVENTION

In accordance with this invention, there is provided a nozzle assembly comprising a nozzle, an alignment plate, and an arm extending between the nozzle and the alignment plate, the arm further including an air conduit for connecting said nozzle to a source of pressurized air supply, wherein the nozzle, arm and alignment plate form a unitary nozzle assembly. In an alternate embodiment, the nozzle assembly further comprises a base having an alignment plate receptor on which the alignment plate is mounted. The nozzle assembly in yet another embodiment further comprises a linear actuator connected to the base for moving the base along a linear path from a first, operating position to a second, standby position.

Preferably, the alignment plate comprises a first alignment surface angled with respect to a reference plane at a predetermined angle. Also preferably, the nozzle assembly further comprises a thermocouple assembly for measuring nozzle discharge air temperature.

In accordance with this invention, there is also provided an improved heat sealing machine for heat sealing a fabric seam wherein the improvement comprises the removable nozzle assembly comprising a nozzle, an alignment plate, and an arm extending between the nozzle and the alignment plate. The arm further includes an air conduit for connecting said nozzle to a source of pressurized air supply, wherein the nozzle, arm and alignment plate form a unitary nozzle assembly. The nozzle assembly further comprises a base having an alignment plate receptor on which the alignment plate can be repeatably mounted in substantially exactly the same position relative to the base. The heat sealing machine may further comprise a linear actuator connected to the base for moving the base along a linear path from a first, operating position to a second, standby position.

BRIEF DESCRIPTION OF DRAWINGS

FIG. 3 provides an exploded diagram of the nozzle, arm, and alignment plate.

DETAILED DESCRIPTION OF THE INVENTION

The invention will next be illustrated with reference to the figures wherein similar numbers indicate same elements in all figures. Such figures are intended to be illustrative rather than limiting and are included herewith to facilitate the explanation of the system and related process implemented thereby.

Figure 1:
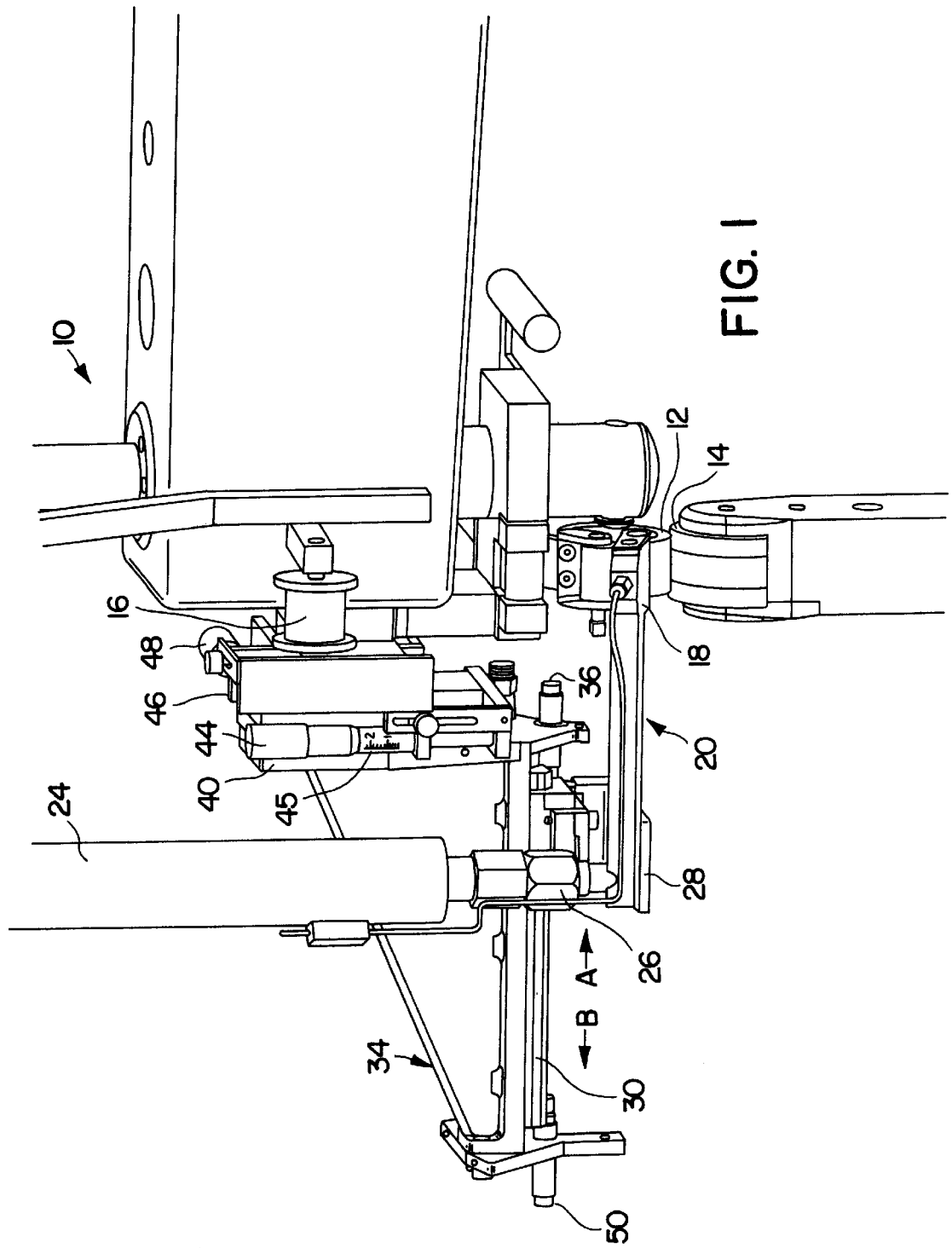
FIG. 1 provides a view of the nozzle assembly attached to a seam sealing machine, from the perspective of an operator using the machine.
Figure 1A:
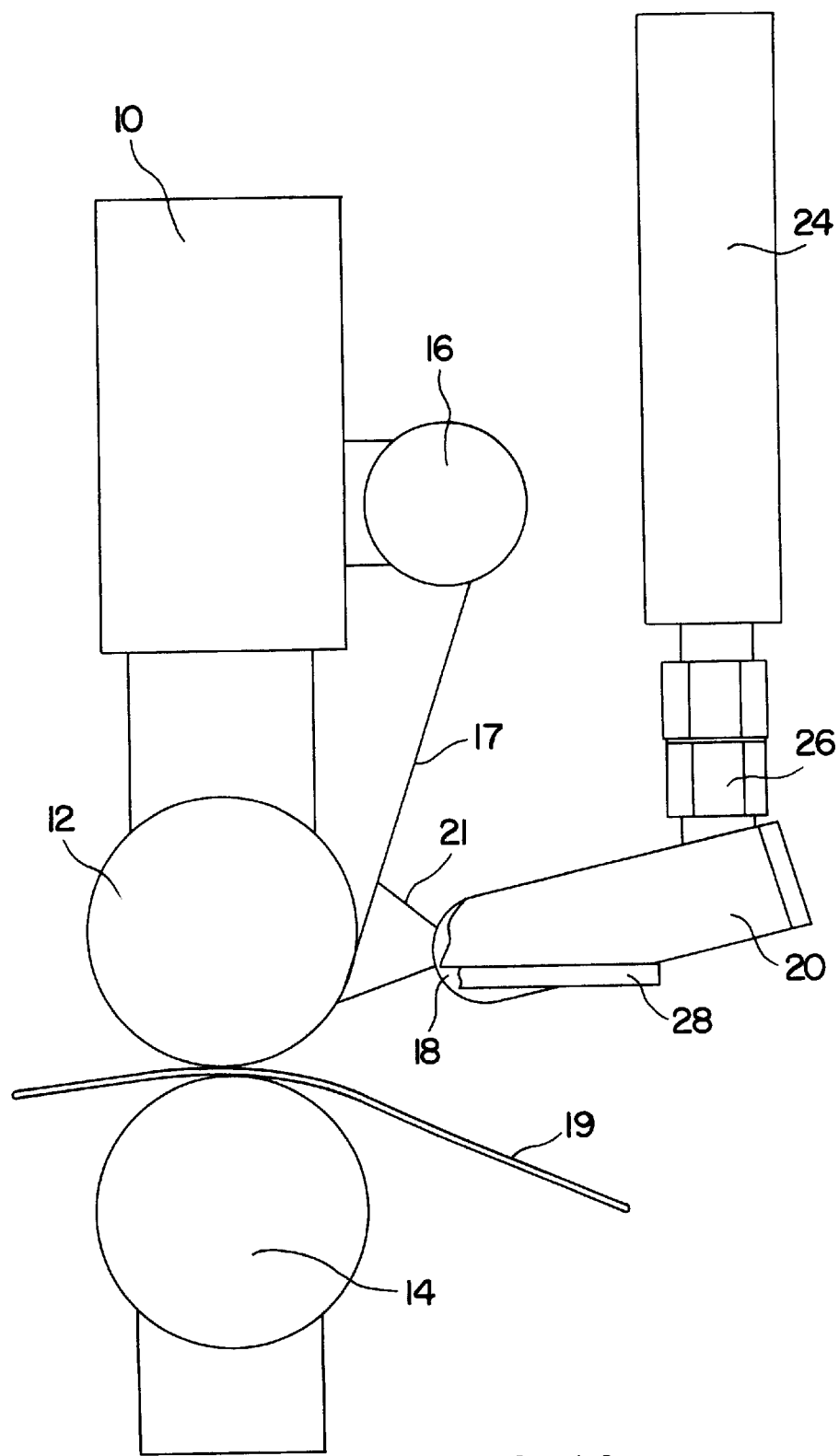
FIG. 1A provides a side view of the nozzle assembly attached to a seam sealing machine, with portions of the alignment plate and mounting bracket cut away and without the supporting structure, to show the interface between the nozzle, the seam tape, and the fabric to be sealed.

Referring to FIGS. 1 and 1A there is shown one embodiment of the nozzle assembly of this invention used at a heat sealing station of a seam sealing machine 10 having pressure-applying nip rollers 12 and 14 and roller 16. Heat-activated seam sealing tape 17 is guided by roller 16 and aligned with a fabric seam 19 such that the seam and the tape are fed between nip rollers 12 and 14. As the tape approaches the seam immediately prior to being fed into the nip rollers, a stream of hot air 21 from nozzle 18 melts the tapes heat-activated adhesive backing.

Referring briefly to FIG. 3, there is shown that nozzle 18 is connected to an integral alignment plate 80 by an arm 82 extending parallel to the nozzle. Nozzle 18, arm 82, and alignment plate 80 together form a single unit, hereinafter referred to as unitary nozzle assembly 20.

Returning now to FIG. 1 and 1A, there is shown pressurized air supply 24 from which hot air enters unitary nozzle assembly 20 at hot air connector 26 and discharges at nozzle 18. Unitary nozzle assembly 20 is mounted on base 28 that slides horizontally in a linear path in the direction of arrows AA@ and AB@ along slider track 30 of supporting structure 34. Movement of the base 28 is delimited in the direction of arrow AA@ by adjustable travel stop 36. The position where base 28 rests against travel stop 36 comprises a first, operating position. In the embodiment shown, the supporting structure is a linear slide bearing model number HSR-15A manufactured by THK America, but any equivalent device capable of providing adjustable linear positioning consistent with the preferred embodiment may also be used.

Supporting structure 34 is attached to vertical bearing positioner stage assembly 40 having a positioning device 44 that preferably has a numeric indicator 45. In the particular embodiment shown, the positioning device is equipped with a micrometer that is turned to move the bearing positioner stage up and down, each turn aligning a specific portion of the knob with a numeric scale, from which the exact position can be numerically defined.

Vertical bearing positioner stage 40 is connected to horizontal bearing positioner stage 46 having a similar positioning device 48 as that of the vertical positioner stage, but adjustable in the horizontal direction toward and away from the machine operator. Specifically, the horizontal and vertical positioner stages in the preferred embodiment are cross-rolling bearing positioner stages, such as model number CR 4554 manufactured by the Parker Hannifin Corporation, Daedal Division, in Harrison City, Pa. Any equivalent positioner stage capable of providing adjustable horizontal and vertical positioning within predictable tolerances and consistent with this embodiment may also be used, as can any combination of positioners having means to repeatedly and precisely position the nozzle of the present invention in relation to an article to be heated.

Thus, within predictable, predefined, and known tolerances, the precise position of the nozzle 18 when applying the hot air to the seam tape is fixed by adjusting the positioning devices 44 and 48 on positioner stages 40 and 46 respectively, and by adjusting the travel stop 36 on supporting structure 34. As each seam to be sealed is ready to be fed into the machine, base 28 slides along the slider track 30 of supporting structure 34 in the direction of arrow AB@ until it hits fixed travel stop 50. With the base in this second, standby position, the nozzle does not obstruct the work area while the seam is fed into the machine. After a seam is in position, the slider slides back into place in the direction of arrow AA@ until it hits adjustable travel stop 36, at which point the nozzle is aligned with the seam seal tape in the first operating position. This sliding motion is obtained by the machine operator activating (by means not shown) a linear actuator (detailed hereinbelow) attached to base 28.

Figure 2:
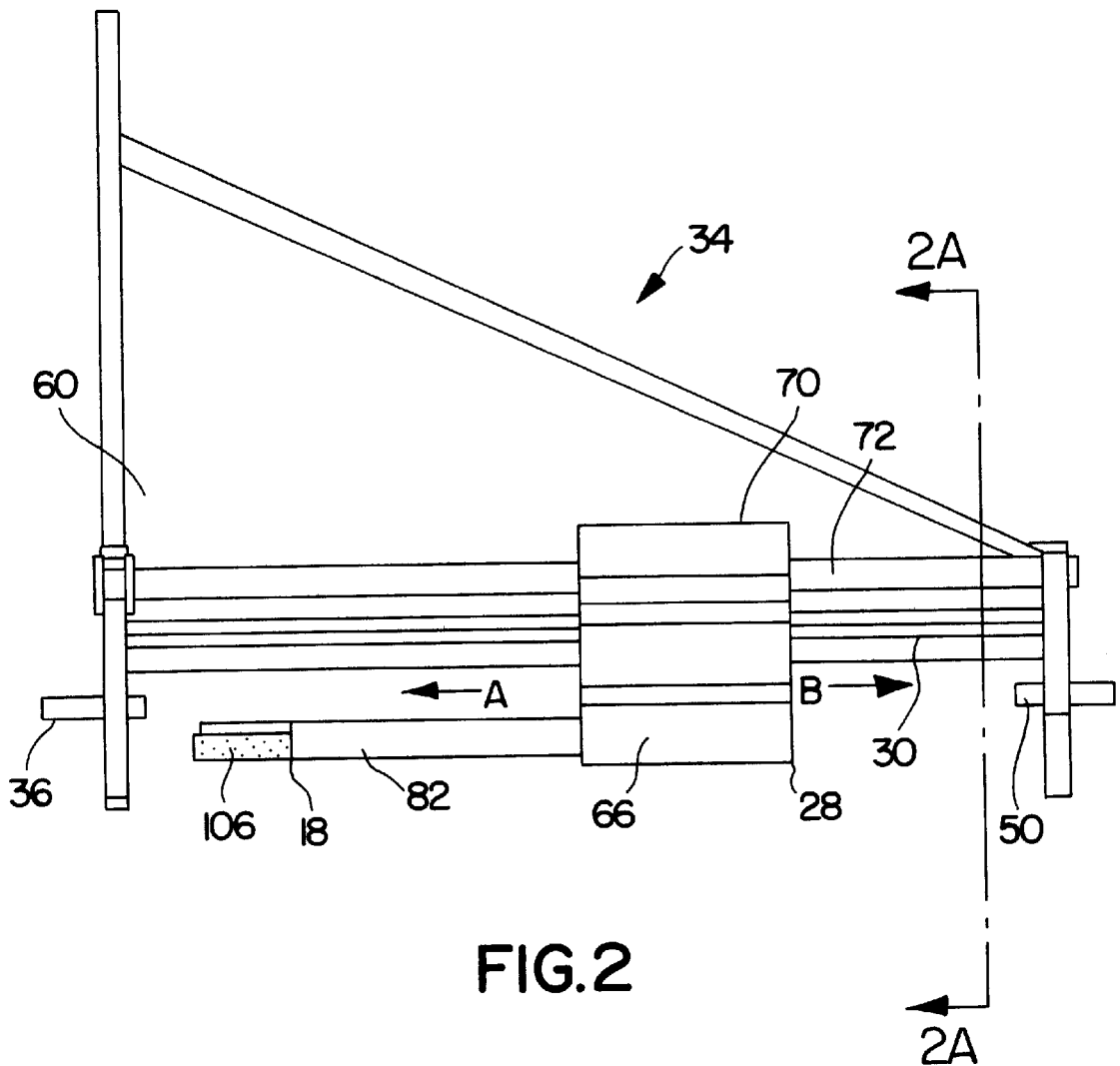
FIG. 2 provides a view of the supporting structure, the base, and the nozzle, arm, and alignment plate that comprise a unitary nozzle assembly mounted thereon, from the perspective opposite the machine operator, showing the actuator.
Figure 2A:
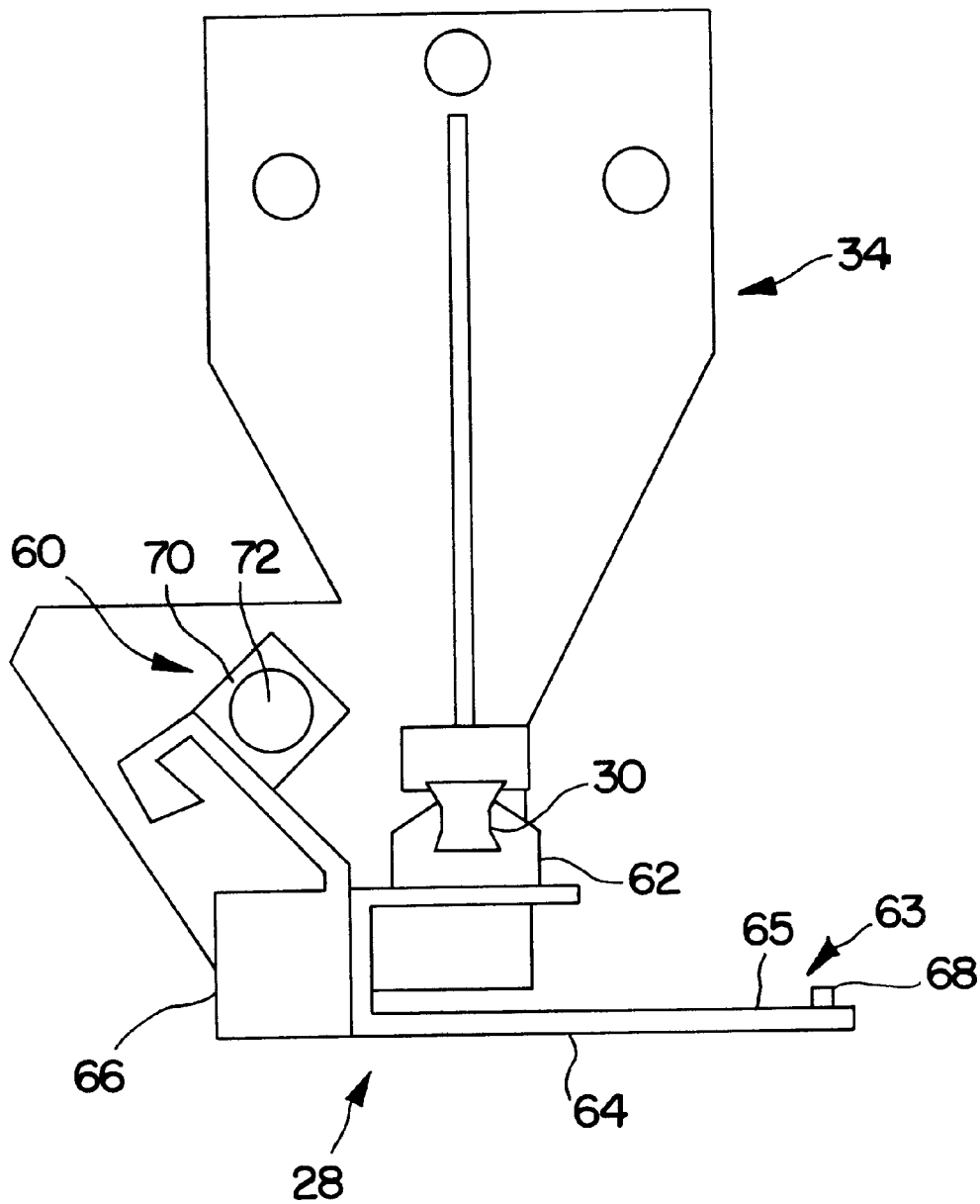
FIG. 2A provides a cutaway end view of the supporting structure with the base mounted thereon. The nozzle, arm, and alignment plate are not shown, so that one of the alignment plate receptor positioning pins is visible.

Referring next to FIGS. 2 and 2A, there is shown the relationship of the base and the supporting structure in an embodiment of the present invention. Base 28 comprises slider truck 62 that rides on slider track 30 and is connected to mounting bracket 64, which is further connected to actuator connecting bracket 66. Mounting bracket 64 further comprises alignment plate receptor 63 having a surface 65. The alignment plate receptor further comprises a set of positioning pins 68.

In the embodiment shown in FIG. 2 and 2A, linear actuator 60 is a rodless cylinder actuator, manufactured by the Bimba Manufacturing Company of Monee, Ill., that further consists of a traveler 70 having a hollow bore adapted to fit and travel along the length of cylinder 72. Traveler 70 connects to the actuator connecting bracket 66 to allow transfer of its actuator motion to the base 28. In the preferred embodiment, air connections (not shown) at either end of cylinder 72 supply air pressure controlled by the machine operator via a foot pedal or other means (not shown) that moves an internal piston (not shown) connected to a magnet (not shown) inside cylinder 72. The movement of the internal piston in response to the air pressure, moves the magnet, which in turn moves traveler 70. In this manner, the machine operator moves the nozzle into and out of position for sealing. The use of any equivalent device known in the art for providing operator controlled linear motion consistent with the preferred embodiment, such as a belt drive or standard pneumatic cylinder, is also anticipated by this invention.

Figure 3A:
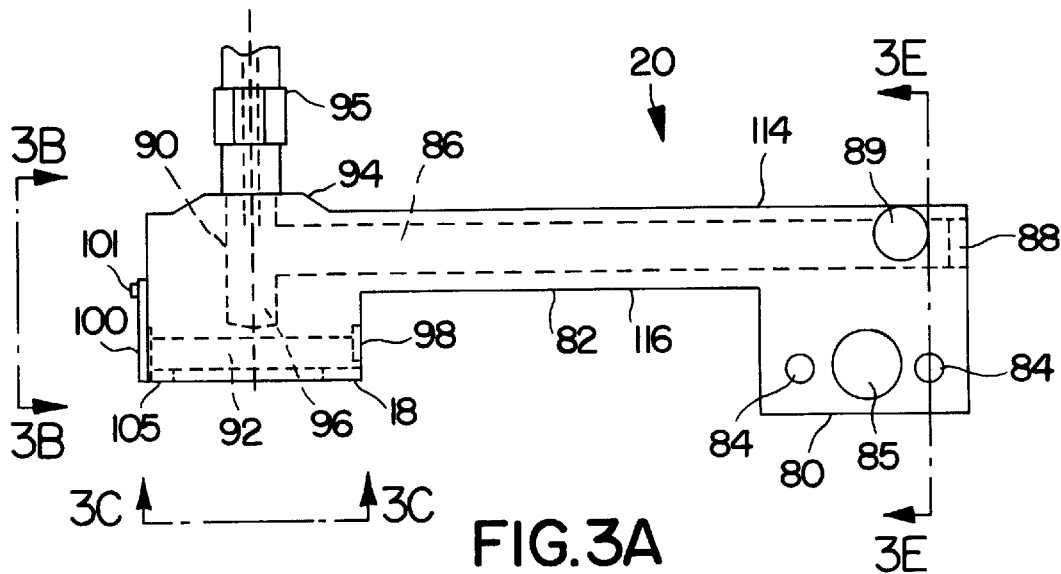
FIG. 3A provides a top view of the nozzle, arm, and alignment plate showing with dashed lines the interior bores and the thermocouple wire disposed therein.

Referring next to FIGS. 3 and 3A, there is shown alignment plate 80, arm 82, and nozzle 18 comprising unitary nozzle assembly 20. Nozzle 18 and alignment plate 80 both protrude from the seam side 116 of arm 82. The alignment plate has positioning holes 84 adapted to fit positioning pins 68 (shown in FIG. 2A), and in the present embodiment, a bolt hole 85 for securing the alignment plate 80 to the alignment plate receptor 63 (shown in FIG. 2A) with a bolt (not shown). Any method for securing alignment plate 80 may be used, however. Similarly, any alignment plate and alignment plate receptor capable of detachably positioning the nozzle with repeatable precision may be used. The pins may be located on the alignment plate and the holes on the alignment plate receptor; or the alignment plate and alignment plate receptor may consist of a tab fitting within a groove.

In an alternate embodiment, bolt hole 85 may also be a positioning hole, and its associated bolt may be a positioning pin with some additional element fixing the alignment to satisfy the requirement to position the nozzle precisely and repeatedly. Thus, alignment plate 80 may comprise a positioning hole and a bolt hole, and the alignment plate receptor may comprise the bolt and a positioning pin.

In yet another alternate embodiment, a single irregularly shaped positioning pin and corresponding positioning hole can repeatedly, removably, and precisely position alignment plate 80 on the alignment plate receptor.

Referring now to FIG. 3A, there is shown an embodiment of unitary nozzle assembly 20 comprising nozzle 18, arm 82, and alignment plate 80 having interior bores that comprise the hot air conduit shown with dashed lines. However, in an alternate embodiment the conduit may be external to the arm. In the embodiment shown in FIG. 3A, elongated bore 86 in the interior of the arm extends from the alignment plate end to the nozzle end. This bore may penetrate the exterior of the arm at the alignment plate end without penetrating the exterior at the nozzle end as shown in FIG. 3A, or in an alternate embodiment the elongated bore may penetrate both ends. The penetration at the alignment plate end is shown plugged with a weld cap 88. Hot air connection hole 89 penetrates the arm at the alignment plate end and intersects with the elongated bore.

Referring briefly to FIG. 3, there is shown hot air connector 26, consisting of welded nipple 25, ferrule 27, and nut 29, attached to the arm at hot air connection hole 89 for connection of the nozzle to a pressurized hot air source.

Referring back to FIG. 3A, elongated bore 86 interconnects with secondary bore 90 having an secondary bore axis 91, and the secondary bore further connects to primary bore 92. In the embodiment shown in FIG. 3A, secondary bore 90 penetrates the arm exterior on the operator side 114 to create thermocouple hole 94 coextensive with secondary bore 90. Thermocouple assembly 95 is connected to the arm at the thermocouple hole, and the thermocouple assembly further includes thermocouple wire 96 that extends from the thermocouple assembly through the secondary bore 90 to the intersection of secondary bore 90 and primary bore 92. Thus, the temperature measurement as sensed by thermocouple wire 96 is a temperature close to the exit of the nozzle.

Referring now to both FIGS. 3 and 3A, primary bore 92 may penetrate both ends of the nozzle or it may penetrate from only one end. Where both ends are penetrated, as shown in the embodiment depicted in FIG. 3 and 3A, weld cap 98 plugs the primary bore on one end. Detachable end plug 100, attached by bolt 101, plugs the primary bore on the other end.

In a stainless steel embodiment of the nozzle, the end plug is made of brass so that the relative difference in expansion coefficient between the two metals produces a tight seal when the nozzle is hot.

Nozzle 18 has a curved face 105, which in an alternate embodiment may be flat or of another geometry. The face is equipped with a set of radially drilled air passages 106, penetrating into primary bore 92.

Figure 3B:
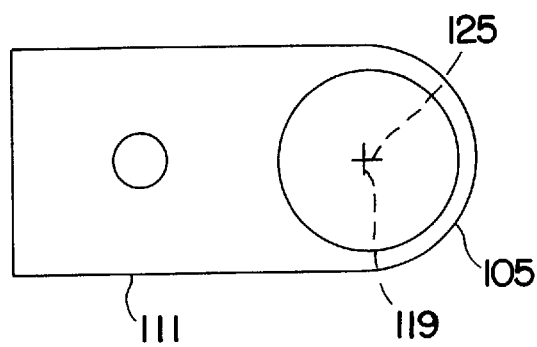
FIG. 3B provides an end view of the nozzle only, showing the orientation of the rows of air passages on the face.
Figure 3C:
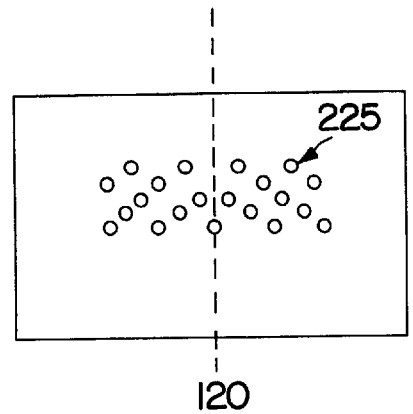
FIG. 3C provides a front view of the nozzle only, to show the symmetrical spacing of the individual air passages in each row on the face.

Referring next to FIG. 3B and 3C, there are shown a total of twenty-one air passages 106 in one embodiment distributed in five rows radially drilled in curved face 105. Each row of air passages lies on a plane that also contains primary bore axis 119, as shown by top row 225 lying on plane 125. The air passages in each row are symmetrically distributed horizontally about the circumferential centerline 120.

Generally, the dimensions of the conduit determine the fluid flow characteristics to which the nozzle air passages are configured, and in turn the conduit dimensions are determined by the pressure, temperature, and flowrate of air and the spatial relationship between the article to be heated and the air supply. It is within the scope of the present invention to provide any combination of nozzle air passages necessary to effect the air distribution required from a nozzle apparatus meeting the description herein and having any set of conduit dimensions.

Figure 3D:
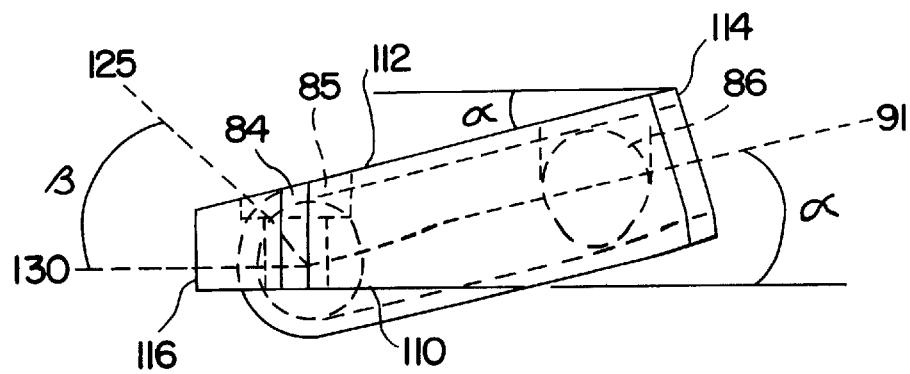
FIG. 3D provides a end view of nozzle, arm, and alignment plate, sectioned through the alignment plate side, to show the angle of the alignment plate alignment surface relative to a reference plane.

The nozzle embodiment shown in FIGS. 3B–3D is typically used with air having a range of pressures from 15 to 30 psig, temperatures from 550 B 750 EC, and flowrates from 110 to 160 scfh. The nozzle is typically placed 0.06 to 0.08 inches from the surface to be heated.

Thus, hot air supply 24 is connected at hot air connector 26, and blows a stream of hot air into the unitary nozzle assembly. The hot air travels through elongated bore 86, through secondary bore 90 into primary bore 92 and out of the nozzle 18 through air passages 106. The temperature as sensed by thermocouple assembly 95 via thermocouple wire 96 is used for feedback temperature control of hot air supply 24.

As shown in FIGS. 3E, alignment plate 80 is shown having a wedged shape such that when the alignment surface 110 is mounted horizontally flush to alignment plate receptor surface 65 (show in FIG. 2A), the top side 112 of the nozzle is tilted downward from the operator side 114 to the seam side 116 at an angle of " to the horizontal, where " is between 10 E and 45 E, preferably 20 E. Thus, the alignment plate alignment surface 110 also forms an angle of " with respect to a reference axis (here, secondary bore axis 91, which in this embodiment is parallel to top side 112). This angle allows the nozzle operator to view the seam to be sealed without obstruction of his or her line of sight into the seam sealing area. At α=20 E, the angle between plane 125 containing primary bore axis 119 and the top row of air passages is inclined at an angle β=45 E relative to a horizontal reference plane 130 through the primary bore axis.

The alignment plate alignment surface may mount flush with the alignment plate receptor surface at any angle, as long as the nozzle portion of the unitary nozzle assembly tilts downward from horizontal at an angle that results in an unobstructed visual path to the article to be heated.

The embodiment of the unitary nozzle assembly of the present invention as shown in FIGS. 3B–3E may be manufactured from a single piece of stainless steel bar stock. Thus, its dimensions may be precisely and repeatably machined by a standard, simple process to tight tolerances, making each unitary nozzle assembly so machined interchangeable with any other unitary nozzle assembly so machined.

Referring again to FIGS. 1–3, seam sealing machine 10 can be used to uniformly heat a thermally activated article such as seam tape dispensed from spool 16 to adhere it to a surface, such as seam 19, by the following method.

First, the nozzle carrier base 28 is aligned in a vertical and first horizontal direction using positioner stages 40 and 46. Travel of the carrier is fixed in a second horizontal direction (along arrows A and B) by travel stop 36, thus precisely defining an operating position within a predetermined tolerance relative to the predetermined position for the seam tape.

Next, nozzle 18 as part of unitary nozzle assembly 20 is mounted to the nozzle carrier base 28 using the alignment features (holes 84) integral to the nozzle (by connection to alignment plate 80) that precisely mate with alignment features (pins 68) integral to nozzle carrier base 28. The source of heat from the nozzle, in this case pressurized hot air from air supply 24, is activated by connecting it to the nozzle at hot air connector 26 and commencing hot air flow. The hot air flow is then stabilized by heating it to the desired temperature while blowing it through the nozzle manifold until thermocouple assembly 95 indicates the desired temperature has been reached.

Seam tape 17 guided by roller 16 is then positioned in its predetermined position to be adhered to the fabric seam 19, and the fabric seam is positioned in a second predetermined position. The position of both seam 19 and seam tape 17 is relative to nip rollers 12 and 14 such that the tape will be heated and both the seam and the tape will be pressed between the nip rollers upon activation of the seam sealing machine 10.

Nozzle carrier base 28 is moved along arrow A from its standby position at rest against stop 50, to the operating position at rest against adjustable travel stop 36. The seam tape is then transported past nozzle 18, the stream of uniform hot air 21 from nozzle 18 activates the tapes heat-activated adhesive, and the tape is consolidated onto the seam surface. The automatic rotation of nip rollers 12 and 14 in response to a signal from the operator, usually by depressing a foot treadle, feeds the tape and seam combination through the nip rollers. This provides the transport of tape 17 past nozzle 18 at the desired speed.

The nozzle carrier base 28 is then returned along the direction of arrow B to the standby position against stop 50. The above process can then be repeated for additional seams, beginning from positioning the seam and the tape in their respective positions.

The present invention particularly has the advantage of a user being able to remove and replace the nozzle if necessary, without having to repeat the nozzle carrier base positioning step. Thus, nozzle 18 can be removed from nozzle carrier base 28 by disconnecting the heat source 24 at hot air connection 26 and lifting alignment plate 80, integrally connected to nozzle 18 via arm 82, off of alignment plate receptor 63. Either the exact nozzle 18 may be replaced, or another nozzle manufactured to the same tolerances can be substituted, by re-aligning alignment plate holes 84 to positioning pins 68. The remaining steps necessary to seal seams may then be initiated without any need to reposition positioning stages 40 or 46. Alternate embodiments using alignment plates of the various configurations suggested herein may be used in similar fashion. The ability to align the nozzle repeatedly saves time in the manufacture of sealed seam fabrics.

Although the embodiment of the present invention illustrated herein is adapted for use with a seam sealing machine, this embodiment or an alternate embodiment may be adapted for numerous applications other than seam sealing machines.

Those skilled in the art having the benefit of the teachings of the present invention as hereinabove set forth, can effect numerous modifications thereto. These modifications are to be construed as being encompassed within the scope of the present invention as set for the in the appended claims.

What is claimed:

1. A unitary nozzle assembly comprising a nozzle, an alignment plate, and an arm between the nozzle and the alignment plate, the arm further including an air conduit for connecting said nozzle to a source of pressurized air wherein said nozzle, arm and alignment plate form a single unit.

2. A unitary nozzle assembly according to claim 1 further comprising a base having an alignment plate receptor and wherein said alignment plate is mounted onto the alignment plate receptor.

3. A unitary nozzle assembly according to claim 2 further comprising a linear actuator connected to said base for moving said base along a linear path from a first, operating position to a second standby position.

4. A unitary nozzle assembly according to claim 3 further comprising a supporting structure on which there is mounted the base plate and the linear actuator, said supporting structure including adjustable stops delimiting the path of the base.

5. A unitary nozzle assembly according to claim 2 wherein the alignment plate comprises an alignment plate alignment surface angled with respect to a reference plane at a predetermined angle.

6. A unitary nozzle assembly according to claim 5 wherein the base alignment plate receptor includes a alignment plate receptor surface for mounting the first alignment surface, and wherein the alignment plate is aligned to the receptor with a positioning pin.

7. A unitary nozzle assembly according to claim 6 wherein the conduit is inside said arm.

8. A unitary nozzle assembly according to claim 7 wherein: the nozzle further comprises a width and a front face; the arm further comprises a length parallel to said nozzle width; and the conduit further comprises:

a primary bore in said nozzle, said primary bore having a length along said nozzle width and having a primary bore axis extending therethrough;

a secondary bore extending opposite the front face substantially perpendicular to the primary bore and connected therewith;

an elongated bore in said arm extending along said arm length, said elongated bore having a first end and a second end, said first end connected substantially perpendicular to the secondary bore and said second end terminating in an opening in said arm;

a plurality of air passages extending through said front face to primary bore.

9. A unitary nozzle assembly according to claim 8 further comprising a thermocouple assembly having a thermocouple wire extending through the secondary bore and terminating at the intersection of the primary bore and the secondary bore.

10. A unitary nozzle assembly according to claim 1 wherein said nozzle, arm, and alignment plate are manufactured from a single stainless steel bar.

11. A unitary nozzle assembly according to claim 10 wherein said nozzle, arm, and alignment plate are manufactured from a single stainless steel bar and wherein said end plug is brass.

12. A unitary nozzle assembly according to claim 1 wherein said nozzle is connected to a hot air supple.

13. A heat sealing machine for heat sealing a fabric seam, the machine comprising a fabric transport for transporting said fabric seam along a path through a heat sealing station, the heat sealing station comprising a source of a pressurized heated air and a removable unitary nozzle assembly for uniformly applying said heated air to said fabric seam at the sealing station, the improvement wherein comprises the removable unitary nozzle assembly including:

a nozzle, an alignment plate, an arm extending parallel to the nozzle between the nozzle and the alignment plate, the arm further including an air conduit for connecting said nozzle to the source of pressurized air wherein said nozzle, said arm, and said alignment plate form a single unit; and a base having an alignment plate receptor wherein said alignment plate is mounted onto the alignment plate receptor to repeatably position said removable unitary nozzle assembly at substantially exactly the same position relative to the base.

14. The heat sealing machine of claim 13 wherein the unitary nozzle assembly further comprises a linear actuator connected to said base for moving said base and said nozzle position on said base along a linear path from a first, operating position, where the unitary nozzle assembly applies heated air onto the fabric seam at the heat sealing station, to a second standby position away from the sealing station.

15. A heat sealing machine according to claim 14 further comprising a seam sealing tape dispenser and a guide path for applying seam sealing tape from said dispenser onto the fabric seam and wherein the heating station includes a pair of pressure applying rollers, said unitary nozzle assembly being located just ahead of the rollers along the fabric transport path.

16. The sealing machine according to claim 14 wherein said alignment plate comprises one or more holes, and said alignment plate receptor comprises one or more pins that mate with said alignment plate holes.

17. The sealing machine according to claim 14 wherein said alignment plate comprises one or more pins, and said alignment plate receptor comprises one or more holes that mate with said alignment plate pins.

* * * * *